United States Patent
Hong

(10) Patent No.: US 10,083,114 B2
(45) Date of Patent: Sep. 25, 2018

(54) DATA STORAGE DEVICE AND OPERATING METHOD THEREOF

(71) Applicant: SK hynix Inc., Gyeonggi-do (KR)

(72) Inventor: Sung Kwan Hong, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 62 days.

(21) Appl. No.: 15/453,187

(22) Filed: Mar. 8, 2017

(65) Prior Publication Data
US 2018/0143902 A1    May 24, 2018

(30) Foreign Application Priority Data
Nov. 24, 2016    (KR) ........................ 10-2016-0157501

(51) Int. Cl.
| | |
|---|---|
| *G06F 12/02* | (2006.01) |
| *G06F 3/06* | (2006.01) |
| *G06F 11/10* | (2006.01) |

(52) U.S. Cl.
CPC .......... *G06F 12/0253* (2013.01); *G06F 3/065* (2013.01); *G06F 3/0619* (2013.01); *G06F 3/0625* (2013.01); *G06F 3/0679* (2013.01); *G06F 11/1016* (2013.01); *G06F 11/1092* (2013.01); *G06F 2212/7205* (2013.01)

(58) Field of Classification Search
CPC .................................................. G06F 12/0253
See application file for complete search history.

(56) References Cited

U.S. PATENT DOCUMENTS

| | | | | |
|---|---|---|---|---|
| 8,621,137 B2 * | 12/2013 | Olbrich | ............... | G06F 13/1657 |
| | | | | 710/317 |
| 9,164,887 B2 * | 10/2015 | Chiueh | ............... | G06F 11/1417 |
| 9,448,919 B1 * | 9/2016 | Boyle | ..................... | G06F 12/02 |
| 9,524,791 B1 * | 12/2016 | Kim | ..................... | G11C 16/30 |
| 9,652,330 B2 * | 5/2017 | Yeh | ..................... | G06F 11/1441 |
| 9,921,898 B1 * | 3/2018 | Miller | ................... | G06F 11/073 |
| 2007/0124552 A1 * | 5/2007 | Chen | ................... | G06F 11/1441 |
| | | | | 711/162 |
| 2008/0126686 A1 * | 5/2008 | Sokolov | ................ | G06F 1/3203 |
| | | | | 711/103 |
| 2009/0113112 A1 * | 4/2009 | Ye | ....................... | G06F 12/0246 |
| | | | | 711/102 |
| 2009/0158085 A1 * | 6/2009 | Kern | ................... | G06F 11/1064 |
| | | | | 714/6.13 |

FOREIGN PATENT DOCUMENTS

KR    1020150045747    4/2015

* cited by examiner

*Primary Examiner* — Midys Rojas
*Assistant Examiner* — Khoa D Doan
(74) *Attorney, Agent, or Firm* — IP & T Group LLP

(57) ABSTRACT

A data storage device includes a storage medium including a plurality of memory units; and a controller suitable for performing a state determination operation to first memory units in order of a write sequence until a memory unit stored with an error-correction-failed data when a power supply is restored after an abnormal power-off, skipping the state determination operation to second memory units between the memory unit storing the error-correction-failed data and a pointed memory unit, performing the state determination operation to third memory units after the pointed memory unit in order of the write sequence, and performing a garbage collection operation to the first to third memory units based on a result of the state determination operation.

17 Claims, 6 Drawing Sheets

DATA STORAGE DEVICE AND OPERATING METHOD THEREOF

CROSS-REFERENCES TO RELATED APPLICATION

The present application claims priority under 35 U.S.C. § 119(a) to Korean application number 10-2016-0157501, flied on Nov. 24, 2016, in the Korean Intellectual Property Office, which is incorporated herein by reference in its entirety.

BACKGROUND

1. Technical Field

Various embodiments generally relate to a data storage device, and, more particularly, to a data storage device including a nonvolatile memory device.

2. Related Art

Data storage devices may store data provided by an external device in response to a write request. Data storage devices may also provide stored data to an external device in response to a read request. Examples of external devices that use data storage devices include desktop, portable and mobile electronic devices including computers, digital cameras, cellular phones, smart phones, smart cards, and the like. Data storage devices may be embedded in an external device during manufacturing of the external devices or may be fabricated separately and then connected afterwards to an external device.

The data storage device may be prepared in the form of a Personal Computer Memory Card International Association (PCMCIA) card, a Compact Flash (CF) card, a smart media card, a memory stick, various multimedia cards (e.g., MMC, eMMC, RS-MMC, and MMC-Micro), various secure digital cards (e.g., SD, Mini-SD, and Micro-SD), a Universal Flash Storage (UFS), a Solid State Drive (SSD) and the like.

SUMMARY

In an embodiment, a data storage device may include: a storage medium including a plurality of memory units; and a controller suitable for performing a state determination operation to first memory units in order of a write sequence until a memory unit stored with an error-correction-failed data when a power supply is restored after an abnormal power-off, skipping the state determination operation to second memory units between the memory unit storing the error-correction-failed data and a pointed memory unit, performing the state determination operation to third memory units after the pointed memory unit in order of the write sequence, and performing a garbage collection operation to the first to third memory units based on a result of the state determination operation.

In an embodiment, a method for operating a data storage device may include: performing a state determination operation to first memory units in order of a write sequence until a memory unit stored with an error-correction-failed data after a power supply is restored after an abnormal power-off; skipping the state determination operation to second memory units between the memory unit storing the error-correction-failed data and a pointed memory unit; performing the state determination operation to third memory units after the pointed memory unit in order of the write sequence; and performing a garbage collection operation to the first to third memory units based on a result of the state determination operation.

In an embodiment, a method for operating a data storage device may include: performing a state determination operation to a plurality of memory units in order of a write sequence after a power supply is restored after an abnormal power-off; and performing a garbage collection operation to the memory units based on a result of the state determination operation, wherein the state determination operation is skipped for memory units for which mapping update is completed before the abnormal power-off occurs.

BRIEF DESCRIPTION OF THE DRAWINGS

The above and other features and advantages of the present invention will become more apparent to those skilled in the art to which the present invention belongs by describing various embodiments thereof with reference to the attached drawings in which.

DETAILED DESCRIPTION

Figure 1:
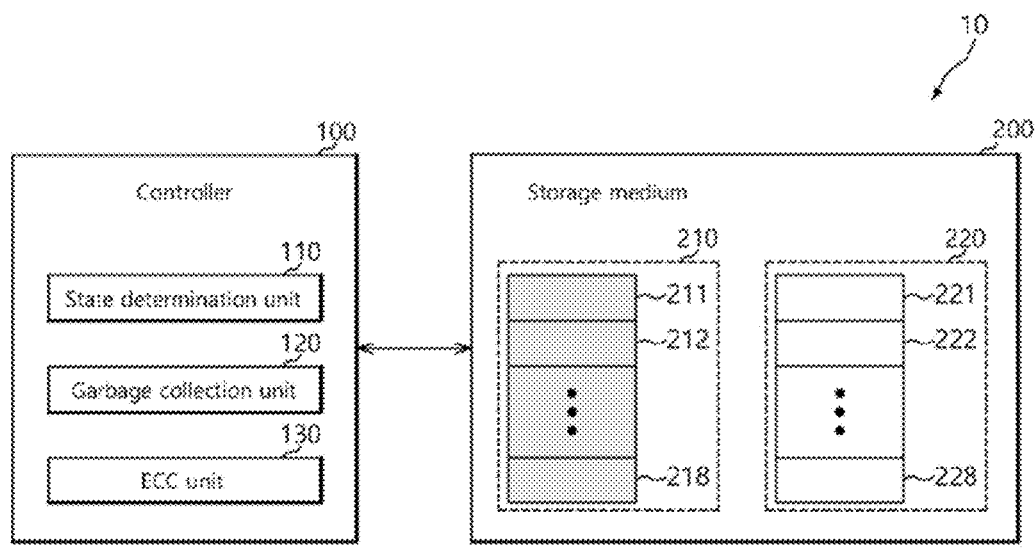
FIG. 1 is a block diagram illustrating a data storage device in accordance with an embodiment.

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of the items in the list. For example, "at least one of A, B, and C" means, only A, or only B, or only C, or any combination of A, b, and C.

The term "or" as used herein means either one of two (or more) alternatives but not both (nor any combinations thereof).

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a data storage device in accordance with an embodiment.

The data storage device 10 may be configured to store data provided from an external device, in response to a write request from the external device. Also, the data storage device 10 may be configured to provide stored data to the external device, in response to a read request from the external device.

The data storage device 10 may store data and output stored data to a host device (not shown), according to control of the host device. The data storage device 10 may be prepared in the form of a Personal Computer Memory Card International Association (PCMCIA) card, a Compact Flash (CF) card, a smart media card, a memory stick, various multimedia cards (e.g., MMC, eMMC, RS-MMC, and MMC-Micro), various secure digital cards (e.g., SD, Mini-SD, and Micro-SD), a Universal Flash Storage (UFS), a Solid State Drive (SSD) and the like.

The data storage device 10 may include a controller 100 and a storage medium 200.

The controller 100 may control the general operations of the data storage device 10. The controller 100 may store data in the storage medium 200 in response to a write request transmitted from an external device, and may read data stored in the storage medium 200 and output the read data to the external device in response to a read request transmitted from the external device.

The controller 100 may include a state determination unit 110, a garbage collection unit 120, and an error correction code (ECC) unit 130.

The state determination unit 110 may detect that power is restored after an abnormal power-off of the data storage device 10, and perform a state determination operation to memory units 211 to 218 of the storage medium 200. The memory units 211 to 218 may be included in a memory region 210 which was designated for a write operation when the abnormal power-off occurred. In order to achieve quick recovery after the abnormal power-off, the state determination unit 110 may skip the state determination operation to some of the memory units 211 to 218, depending on a mapping update status.

For example, the state determination unit 110 may perform the state determination operation to the memory units 211 to 218 according to a write sequence until a memory unit storing error-correction-failed data is detected. In detail, the state determination operation may be performed by determining data stored in the memory units 211 to 218 as in a first state or a second state depending on whether the stored data is new data or old data and whether the error correction operation to the stored data is a success or a failure. The state determination unit 110 may determine the stored data, which is determined as new data and to which the error correction operation succeeds, as in the first state. The state determination unit 110 may determine the stored data, which is determined as old data or to which the error correction operation fails, as in the second state. The data determined as in the second state may be the invalid data. The determination of new data and old data will be described with reference to FIG. 2.

Figure 2:
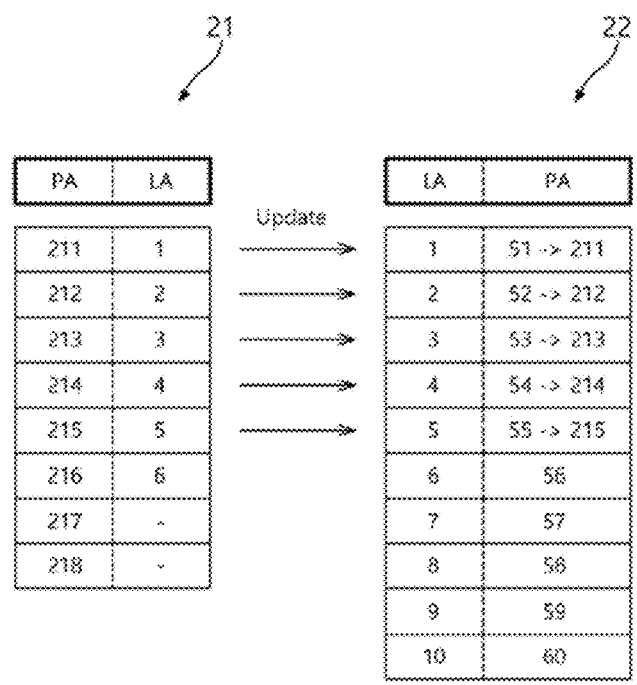
FIG. 2 is a mapping table illustrating a mapping update operation for memory units.

The state determination unit 110 may skip the state determination operation to memory units disposed between a memory unit storing error-correction-failed data and a memory unit selected depending on a mapping update status (hereinafter, referred to as a pointed memory unit) in order of the write sequence among is the memory units 211 to 218. As will be described later, since a mapping update operation is performed with a predetermined cycle and thus status change of the memory units 211 to 218 may not be immediately reflected into a mapping table as shown in FIG. 2, memory units after the pointed memory unit in order of the write sequence may be memory units for which mapping update is not performed before the abnormal power-off occurs even though they are written with data. The memory units before the pointed memory unit in order of the write sequence may be memory units for which mapping update is completed before the abnormal power-off occurs. That is to say, the state determination unit 110 may skip the state determination operation to memory units disposed between the memory unit storing error-correction-failed data and the pointed memory unit. The reason why the state determination operation may be skipped will be described later in detail with reference to FIG. 2.

The state determination unit 110 may perform the state determination operation to the memory units after the pointed memory unit among the memory units 211 to 218 in order of the write sequence until an empty memory unit is detected. Because the state determination operation involves a read operation to a memory unit, the state determination unit 110 may determine whether a corresponding memory unit is an empty memory unit by reading data from the corresponding memory unit. The state determination unit 110 may determine that the corresponding memory unit is an empty memory unit when data read from the corresponding memory unit is determined as erased data.

The garbage collection unit 120 may perform a garbage collection operation to the memory units 211 to 218 based on the result of the state determination operation. The garbage collection unit 120 may perform the garbage collection operation when a predetermined condition is satisfied, for example, when the controller 100 is in an idle state for a predetermined time. In other words, the garbage collection operation may be performed during the idle time of the controller 100.

The garbage collection operation may be performed by classifying the data stored in the memory units 211 to 218 into valid data and invalid data, moving only the valid data to another empty memory region, for example, a memory region 220 as shown in FIG. 1, and performing an erase operation to the memory units 211 to 218. In this regard, when classifying the data stored in a memory unit into valid data and invalid data, the garbage collection unit 120 may perform the garbage collection operation in different schemes between the memory units, to which the state determination operation is performed and skipped.

For example, the garbage collection unit 120 may handle a memory unit to which the state determination operation is performed, as follows. The garbage collection unit 120 may determine whether the data determined as in the first state is still new data or old data. The data in the first state and determined as new data may be the valid data while the data in the first state and determined as old data may be the invalid data. As described above, the data determined as in the second state may be the invalid data as a result of the state determination operation.

The garbage collection unit 120 may handle a memory unit to which the state determination operation is skipped, as follows. The garbage collection unit 120 may determine whether the data stored in the memory unit is new data or old data. Then, the garbage collection unit 120 may determine data, which is determined as new data and for which the error correction operation succeeds, as valid data. The garbage collection unit 120 may also determine data, which is determined as old data or for which the error correction operation fails, as invalid data.

The ECC unit 130 may perform the error correction operation to data read from the storage medium 200, and provide the state determination unit 110 and the garbage collection unit 120 with a result that the error correction operation is a success or a failure during the respective state determination operation of the state determination unit 110 and garbage collection operation of the garbage collection unit 120. For example, the abnormal power-off may change the data stored in memory units, and, if the degree of change is large, the error correction operation may fail.

In summary, since the state determination operation is skipped for some of the memory units 211 to 218, a booting operation including the state determination operation may be performed quickly when power supply is restored after the abnormal power-off.

The storage medium 200 may store data transmitted from the controller 100 and may read stored data and transmit read data to the controller 100, according to control of the controller 100.

The storage medium 200 may include a plurality of nonvolatile memory devices. The nonvolatile memory device may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

The storage medium 200 may include the memory regions 210 and 220. A memory region may be a unit that is allocated to store data. For example, the controller 100 may designate 1 memory region 210 for the purpose of storing data transmitted from the external device, and store data in the memory units 211 to 218 sequentially according to the write sequence. However, 2 or more memory regions may be designated simultaneously for the purpose of storing data transmitted from the external device. Also, while FIG. 1 illustrates 2 memory regions 210 and 220, it is to be noted that the number of the memory regions included in the storage medium 200 is not limited thereto.

The memory regions 210 and 220 may include memory units 211 to 218 and 221 to 228, respectively. The memory units 211 to 218 and 221 to 228 may be included in one nonvolatile memory device. Alternatively, the memory units 211 to 218 and 221 to 228 may be included over a plurality of nonvolatile memory devices. While FIG. 1 illustrates that the respective memory units 210 and 220 include 8 memory units 211 to 218 and 221 to 228, it is to be noted that the number of memory units is not limited thereto.

FIG. 2 is a mapping table illustrating a mapping update operation for the memory units 211 to 218.

A first table 21 may represent logical addresses LA corresponding to the memory units 211 to 218. In FIG. 2, the Nos. of the memory units 211 to 218 may represent physical addresses PA of the memory units 211 to 218.

The second table 22 may represent, for example, physical addresses PA corresponding to logical addresses LA "1" to "10." However, while not shown, the second table 22 may include all logical addresses LA which are provided from the external device.

The controller 100 may generate the first table 21 according to a result of a write operation, and then, update the second table 22 based on the first table 21 with a predetermined cycle. According to an embodiment, the first table 21 may be stored in a volatile memory device (not shown) of the controller 100 and the second table 22 may be stored in the storage medium 200.

In detail, before the second table 22 is updated, the logical addresses LA "1" to "10" may correspond to physical addresses PA "51" to "60." Thereafter, the data of the logical addresses LA "1" to "5" (currently corresponding to the physical addresses PA "51" to "55") may be moved and stored in the memory units of the physical addresses PA "211" to "215." Accordingly, the first table 21 may be updated such that the physical addresses PA "211" to "215" correspond to the logical addresses LA "1" to "5." Then, the second table 22 may be updated such that the logical addresses LA "1" to "5" correspond to the physical addresses PA "211" to "215." The data moved from the memory units of the physical addresses PA "51" to "55" and stored in the memory units of the physical addresses PA "211" to "215" may be new data of the logical addresses LA "1" to "5," and the data moved but still remained in the memory units of the physical addresses PA "51" to "55" may be old data of the logical addresses LA "1" to "5."

Referring to FIG. 1, the determination of new data and old data may be made by the state determination unit 110 for the state determination operation of determining data of the memory units 211 to 218 as in one of the first and second states. The determination of new data and old data may also be made by the garbage collection unit 120 for the garbage collection operation of determining the data of the memory units 211 to 218 as valid or invalid. The state determination unit 110 and the garbage collection unit 120 may perform the determination of new data and old data by comparing the first and second tables 21 and 22.

Referring back to FIG. 2, the data of the logical address LA "6" (currently corresponding to the physical address PA "56") may be moved and stored in the memory unit of the physical address PA "216." Accordingly, the first table 21 may be updated such that the physical address PA "216" corresponds to the logical address LA "6." However, since the mapping update operation is performed with a predetermined cycle, update for the logical address LA "6" in the second table 22 may not be immediately performed but may be deferred. The data moved from the memory unit of the physical address PA "56" and stored in the memory unit of the physical address PA "216" may be new data of the logical address LA "6," and the data moved but still remained in the memory unit of the physical address "56" may be old data of the logical address LA "6."

In such a mapping update status, in the case where an abnormal power-off occurs, a pointed memory unit may be the memory unit of the physical address PA "216." It may be possible to determine whether new data or old data are stored in the mapping-update-completed memory units of the physical addresses PA "211" to "215" by referring to the second table 22 including a latest mapping information during the garbage collection operation rather than immediately after the power supply restoration from the abnormal power-off. However, it may be required to determine whether new data or old data are stored in the mapping-update-uncompleted memory unit of the physical address PA "216" Immediately after the power supply restoration from the abnormal power-off. Otherwise, due to subsequent data update of the memory unit of the physical address PA "216", it may become difficult to determine as a direct impact of the abnormal power-off whether new data or old data are stored in the mapping-update-uncompleted memory unit of the physical address PA "216".

Therefore, in the embodiment, the state determination operation to the mapping-update-completed memory units may be skipped at a booting stage, which is required to be processed rapidly 2o immediately after the power supply restoration from the abnormal power-off. Whether new data or old data is stored and whether the error correction operation to new data is successful in the mapping-update-completed memory unit, to which the state determination operation is skipped at the booting stage, may be determined resultantly during the garbage collection operation. In this regard, by skipping the state determination operation to some selected memory units among the mapping-update-completed memory units to which mapping update is completed, an overhead may be appropriately distributed over the booting stage and the garbage collection operation. In accordance with an embodiment of the present invention, the mapping-update-completed memory units to which the state determination operation is to be skipped may be between the memory unit to which the error correction operation is detected as a failure and the pointed memory unit. This is because memory units to which error correction operation fails generally gathers in particular area and the error correction operation to such memory units will require a substantially long time.

Figure 3:
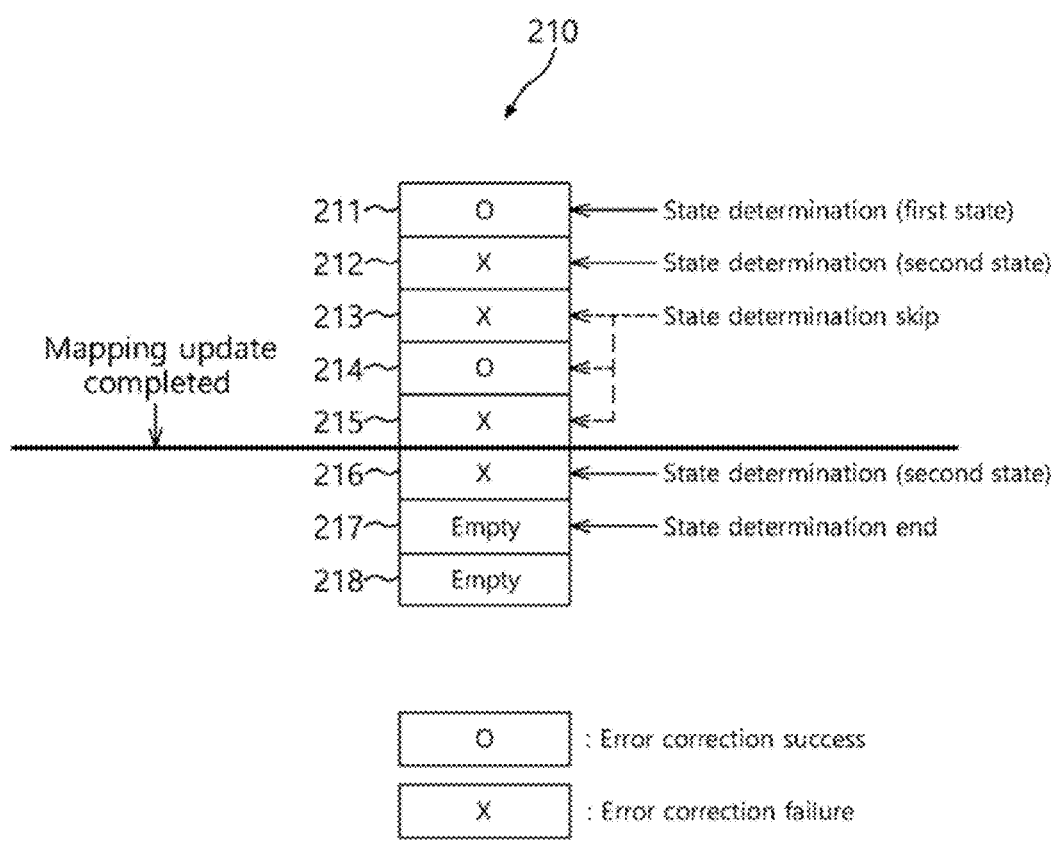
FIG. 3 is a diagram illustrating the state determination operation of a state determination unit shown in FIG. 1.

FIG. 3 is a diagram illustrating a state determination operation of the state determination unit 110 shown in FIG. 1.

FIG. 3 illustrates the 8 memory units 211 to 218 which are included in the memory region 210. At a time when an abnormal power-off occurs, the memory units 211 to 216 may be in a state in which they are stored with data, and the memory units 217 and 218 may be in an empty state. Also, mapping update for the memory units 211 to 215 may be completed, and mapping update for the memory unit 216 may not be completed when the abnormal power-off occurs. Therefore, the memory unit 216 may be designated as the pointed memory unit when a power supply is restored after the abnormal power-off.

The state determination unit 110 may start the state determination operation from the memory unit 211 when a power supply is restored after the abnormal power-off. The state determination unit 110 may determine whether the data stored in the memory unit 211 is new data or old data. In general, a method for determining whether data is new data or old data may include comparing the first and second tables 21 and 22 as described above with reference to FIG. 2. However, when an abnormal power-off occurs, the first table 21 stored in the controller 100 may be erased and the determination of new data or old data may be performed by reading a logical address corresponding to the memory unit 211, which is stored as a management Information in a spare portion of the memory unit 211. The state determination unit 110 may determine that the data stored in the memory unit 211 is, for example, new data. When the error correction operation of the ECC unit 130 to the data stored in the memory unit 211 is a success, the state determination unit 110 may determine the data stored in the memory unit 211 as in the first state.

In a similar manner, the state determination unit 110 may determine that the data stored in the memory unit 212 is new data. When the error correction operation of the ECC unit 130 to the data stored in the memory unit 212 fails, the state determination unit 110 may determine the data stored in the memory unit 212 as in the second state.

Because the state determination unit 110 detects the error-correction-failed data in the memory unit 212, the state determination unit 110 may skip the state determination operation to the memory units 213 to 215 between the memory unit 212 and the pointed memory unit 216. That is to say, the memory units 213 to 215 may be detected as memory units for which mapping update is completed when the abnormal power-off occurs.

The state determination unit 110 may proceed with the state determination operation to the pointed memory unit 216. The state determination unit 110 may determine that the data stored in the memory unit 216 is new data. When the error correction operation of the ECC unit 130 for the data stored in the memory unit 216 falls, the state determination unit 110 may determine the data stored in the memory unit 216 as in the second state.

The state determination unit 110 may read the memory unit 217 to perform the state determination operation to the memory unit 217, obtain erased data, and determine that the memory unit 217 is an empty memory unit. Hence, the state determination unit 110 may end the state determination operation.

The data stored in the memory unit 211 and determined as in the first state through the state determination operation may be valid when it is determined still as new data at the time the garbage collection operation is performed. The data stored in the memory units 212 and 216 and determined as the second state may be Invalid. The data stored in the memory units 213 to 215 to which the state determination operation is skipped may be valid when they are determined as new data during the time the garbage collection operation and the error correction operation thereto succeeds. The data stored in the memory units 213 to 215 to which the state determination operation is skipped may be invalid when they are determined as old data during the time the garbage collection operation or the error correction operation thereto fails.

Figure 4:
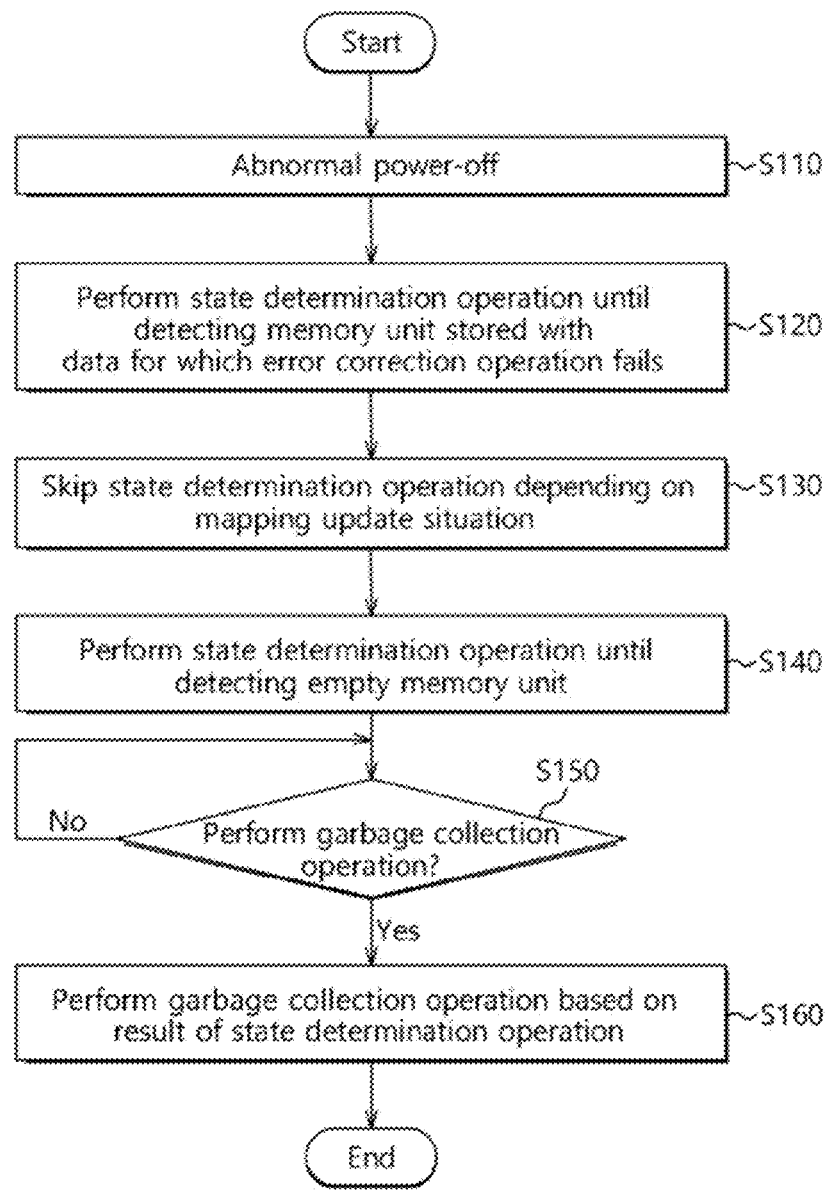
FIG. 4 is a flow chart illustrating a method for operating the data storage device of FIG. 1.

FIG. 4 is a flow chart illustrating a method for operating the data storage device 10 of FIG. 1.

At step S110, the state determination unit 110 may detect that a power supply is restored after an abnormal power-off. At this time, a memory unit, to which a data is written but the mapping update for the written data is not completed yet in the memory region 210 when the abnormal power-off occurs, may be designated as the pointed memory unit. The memory region 210 may be a memory region which is designated for the purpose of performing a write operation.

At step S120, the state determination unit 110 may perform the state determination operation sequentially according to a write sequence for memory units included in the memory region 210 until a memory unit stored with an error-correction-failed data is detected.

At step S130, the state determination unit 110 may skip the state determination operation to memory units between the memory unit storing the error-correction-failed data and the pointed memory unit in the memory region 210. The memory units to which the state determination operation is skipped may be memory units to which mapping update is completed before the abnormal power-off occurs. Memory units after the pointed memory unit in order of the write sequence may be memory units to which mapping update is not performed before the abnormal power-off occurs.

At step S140, the state determination unit 110 may proceed with the state determination operation to the memory units after the pointed memory unit according to the write sequence in the memory region 210. The state determination unit 110 may perform the state determination operation until detecting an empty memory unit. The state determination unit 110 may end the state determination operation when the empty memory unit is detected.

At step S150, the garbage collection unit 120 may determine whether to perform the garbage collection operation, depending on a predetermined condition. The predetermined condition may include, for example, whether the controller 100 is in an idle state for a predetermined time. In the case where it is determined that the garbage collection operation is not to be performed, the process may repeat the step S150. In the case where it is determined that the garbage collection operation is to be performed, the process may proceed to step S160.

At the step S160, the garbage collection unit 120 may perform the garbage collection operation to the memory region 210 based on the result of the state determination operation. The garbage collection operation may be performed by classifying the data stored in the memory region 210 into valid data and invalid data, moving only the valid data to another empty memory region, and performing an erase operation to memory units.

According to an embodiment, the step S120 may be omitted. In other words, the state determination unit 110 may skip the state determination operation to all memory units before the pointed memory unit in order of the write sequence in the memory region 210. Namely, memory units for which the state determination operation is skipped may be all memory units for which mapping update is completed before the abnormal power-off occurs.

Figure 5:
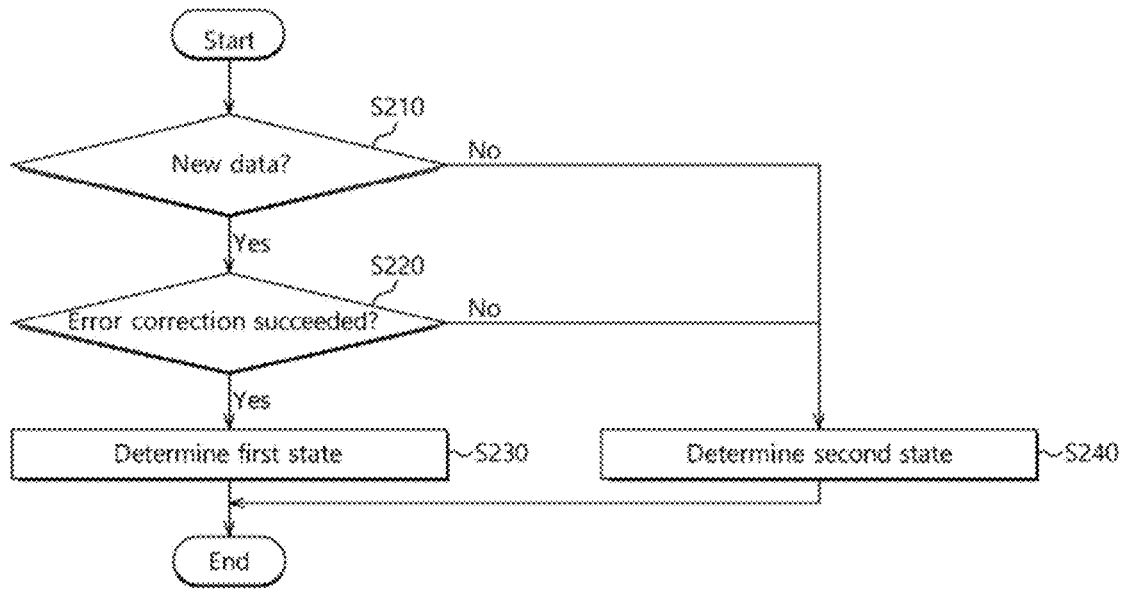
FIG. 5 is a flow chart Illustrating a method for the state determination unit of FIG. 1 to perform a state determination operation.

FIG. 5 is a flow chart illustrating a method for the state determination unit 110 of FIG. 1 to perform the state determination operation.

At step S210, the state determination unit 110 may determine whether the data stored in a memory unit is new data or old data. When it is determined that the data stored in the memory unit is new data, the process may proceed to step S220. When it is determined that the data stored in the memory unit is old data, the process may proceed to step S240.

At the step S220, the state determination unit 110 may determine whether the error correction operation of the ECC unit 130 to the data stored in the memory unit is a success or a failure. When it is determined that the error correction operation is a success, the process may proceed to step S230. When it is determined that the error correction operation is a failure, the process may proceed to the step S240.

At the step S230, the state determination unit 110 may determine the data stored in the memory unit as in the first state.

At the step S240, the state determination unit 110 may determine the data stored in the memory unit as in the second state.

Figure 6:
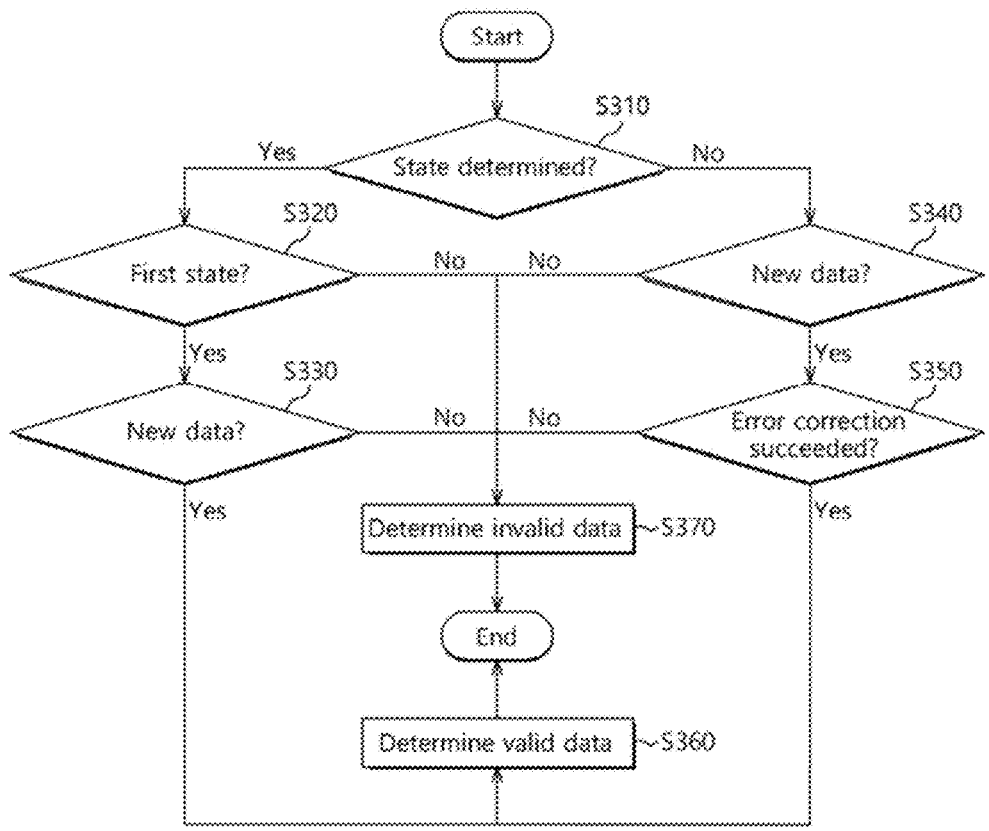
FIG. 6 is a flow chart illustrating a method for a garbage collection unit of FIG. 1 to determine the data stored in a memory unit as valid data or invalid data.

FIG. 6 is a flow chart illustrating a method for the garbage collection unit 120 of FIG. 1 to determine the data stored in a memory unit as valid data or invalid data.

At step S310, the garbage collection unit 120 may determine whether a state is determined for the data stored in a memory unit through the state determination operation. In other words, the garbage collection unit 120 may determine whether the state determination operation to the memory unit is skipped. When a state is determined (i.e., the state determination operation has been performed to the memory unit), the process may proceed to step S320. When a state is not determined, that is, when the state determination operation is skipped, the process may proceed to step S340.

At the step S320, the garbage collection unit 120 may determine whether the data stored in the memory unit has been determined as in the first state through the state determination operation. When the data is determined as in the first state, the process may proceed to step S330. When the data is determined as not the first state but the second state, the process may proceed to step S370.

At the step S330, the garbage collection unit 120 may determine whether the data determined as in the first state is still new data. When it is determined that the data is still new data, the process may proceed to step S360. When it is determined that the data is not new data but old data, the process may proceed to the step S370.

At the step S340, the garbage collection unit 120 may determine whether the data stored in the memory unit, to which the state determination operation is skipped, is new data. When it is determined that the data is new data, the process may proceed to step S350. When it is determined that the data is not new data but old data, the process may proceed to the step S370.

At the step S350, the garbage collection unit 120 may determine whether the error correction operation of the ECC unit 130 for the data determined as new data at step S340 is a success or a failure. When it is determined that the error correction operation is a success, the process may proceed to the step S360. When it is determined that the error correction operation is a failure, the process may proceed to the step S370.

At the step S360, the garbage collection unit 120 may determine as valid data the state-determination-performed data determined as in the first state and still as new data ("YES" at steps S310, S320, S330), and the state-determination-skipped data determined as new data and as error-correction-successful ("YES" at step S350).

At the step S370, the garbage collection unit 120 may determine as invalid data the state-determination-performed data determined as in the second state ("NO" at step S320), the state-determination-performed data determined as in the first state but as old data ("NO" at step S330), the state-determination-skipped data determined as old data ("NO" at step S340), and the state-determination-skipped data determined as new data but as error-correction-failed ("NO" at step S350).

Figure 7:
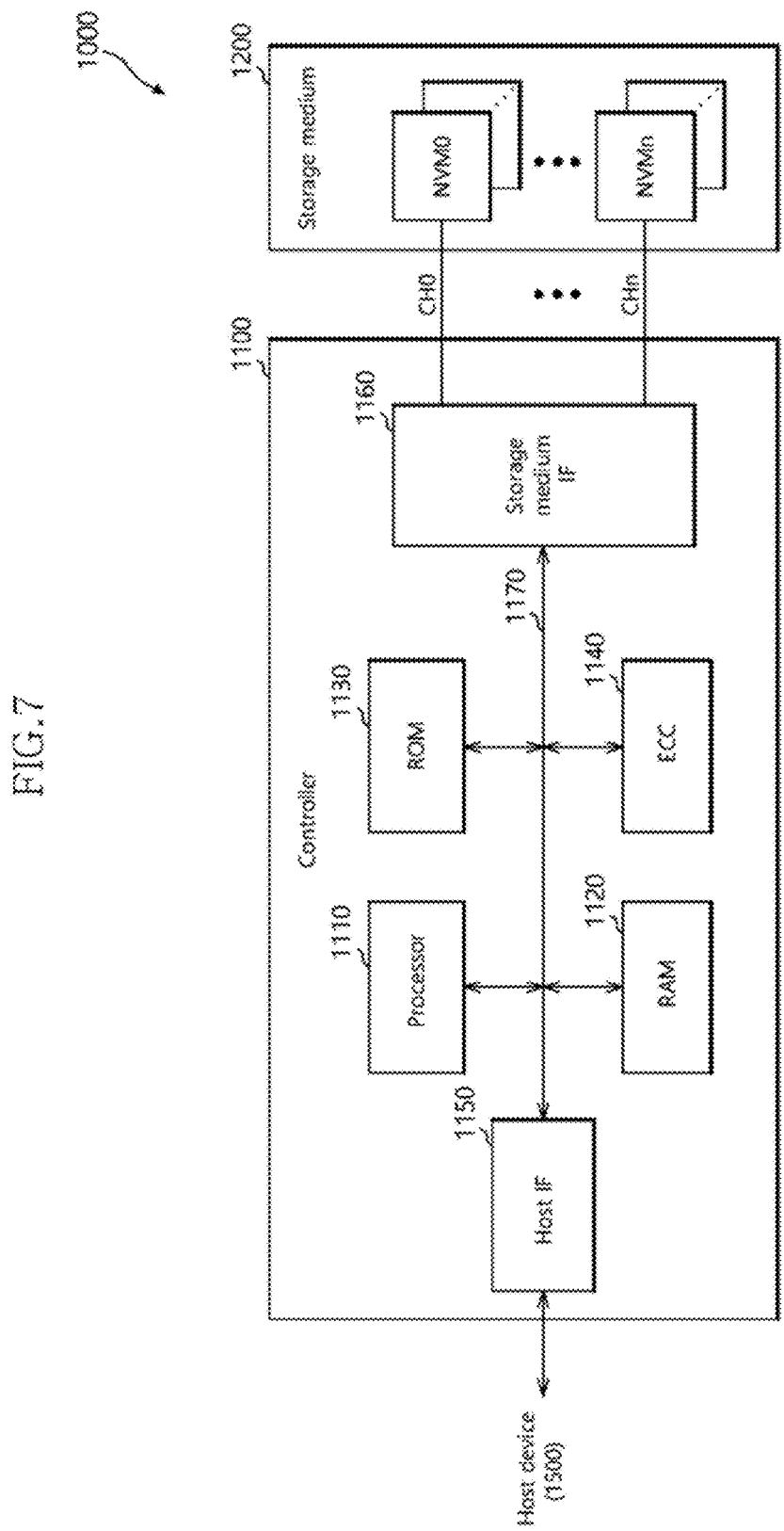
FIG. 7 is a block diagram illustrating a solid state drive (SSD) in accordance with an embodiment.

FIG. 7 is a block diagram Illustrating a solid state drive (SSD) 1000 in accordance with an embodiment.

The SSD 1000 may include a controller 1100 and a storage medium 1200.

The controller 1100 may control data exchange between a host device 1500 and the storage medium 1200. The controller 1100 may include a processor 1110, a RAM 1120, a ROM 1130, an ECC unit 1140, a host interface 1150 and a storage medium interface 1160 which are coupled through an internal bus 1170.

The controller 1100 may operate substantially similarly to the controller 100 shown in FIG. 1.

The processor 1110 may control general operations of the controller 1100. The processor 1110 may store data in the storage medium 1200 and read stored data from the storage medium 1200, according to data processing requests from the host device 1500. In order to efficiently manage the storage medium 1200, the processor 1110 may control internal operations of the SSD 1000 such as a merge operation, a wear leveling operation, and so forth.

The RAM 1120 may store programs and program data to be used by the processor 1110. The RAM 1120 may temporarily store data transmitted from the host interface 1150 before transferring it to the storage medium 1200, and may temporarily store data transmitted from the storage medium 1200 before transferring it to the host device 1500.

The ROM 1130 may store program codes to be read by the processor 1110. The program codes may include commands to be processed by the processor 1110, for the processor 1110 to control the internal units of the controller 1100.

The ECC unit 1140 may encode data to be stored in the storage medium 1200, and may decode data read from the storage medium 1200. The ECC unit 1140 may detect and correct an error occurred in data, according to an ECC algorithm.

The host interface 1150 may exchange data processing requests, data, etc. with the host device 1500.

The storage medium interface 1160 may transmit control signals and data to the storage medium 1200. The storage medium interface 1160 may be transmitted with data from the storage medium 1200. The storage medium interface 1160 may be coupled with the storage medium 1200 through a plurality of channels CHO to CHn.

The storage medium 1200 may include the plurality of nonvolatile memory devices NVMO to NVMn. Each of the plurality of nonvolatile memory devices NVMO to NVMn may perform a write operation and a read operation according to control of the controller 1100.

Figure 8:
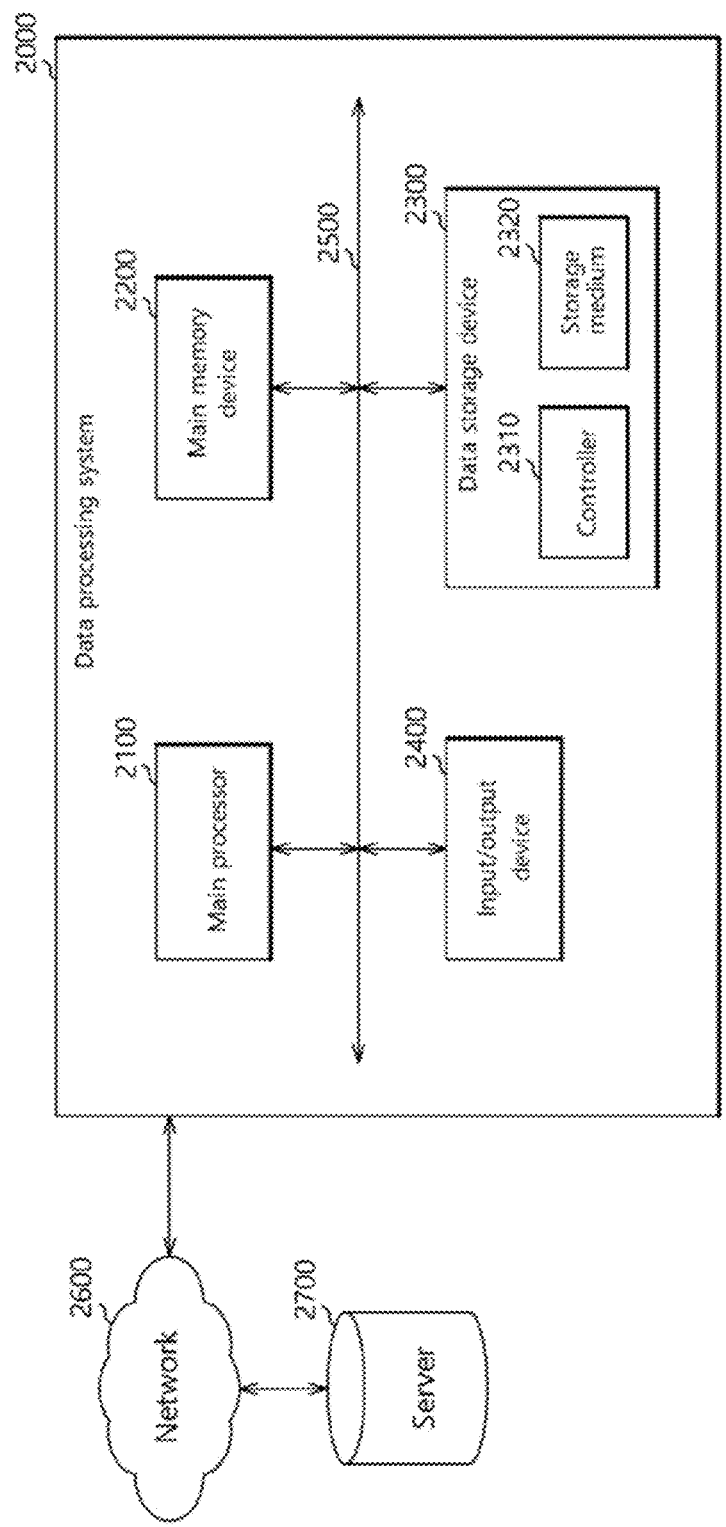
FIG. 8 is a block diagram illustrating a data processing system to which the data storage device in accordance with the embodiment is applied.

FIG. 8 is a block diagram illustrating a data processing system 2000 to which the data storage device 10 in accordance with the embodiment is applied.

The data processing system 2000 may include any suitable electronic device such as a computer, a laptop, a netbook, a smart phone, a digital TV, a digital camera, a navigator, etc. The data processing system 2000 may include a main processor 2100, a main memory device 2200, a data storage device 2300, and an input/output device 2400. The internal units of the data processing system 2000 may exchange data, control signals, etc. through a system bus 2500.

The main processor 2100 may control general operations of the data processing system 2000. The main processor 2100 may be a central processing unit, for example, such as a microprocessor.

The main processor 2100 may execute softwares such as an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate substantially similarly to the data storage device 10 of FIG. 1.

The input/output device 2400 may Include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a LAN (local area network), a WAN (wide area network), a wireless network, and so on. The data processing system 2000 may include a network interface (not shown) to access the network 2600.

While various embodiments have been described above, it will be understood to those skilled in the art that the embodiments described are examples only. Accordingly, the data storage device and the operating method thereof described herein should not be limited based on the described embodiments only and that many other embodiments and variations thereof may be envisaged by those skilled in the art to which the present invention pertains.

What is claimed is:

1. A data storage device comprising:
    a storage medium including a plurality of memory units; and
    a controller suitable for performing a state determination operation to first memory units in order of a write sequence until a memory unit stored with an error-correction-failed data when a power supply is restored after an abnormal power-off, skipping the state determination operation to second memory units between the memory unit storing the error-correction-failed data and a pointed memory unit, performing the state determination operation to third memory units after the pointed memory unit in order of the write sequence, and performing a garbage collection operation to the first to third memory units after completion of all of the state determination operations,
    wherein the second memory units are memory units for which mapping update is completed before the abnormal power-off occurs, and the third memory units are memory units for which mapping update is not completed before the abnormal power-off occurs.

2. The data storage device according to claim 1, wherein, when performing the state determination operation, the controller determines new and error-correction-successful data of each memory unit as in a first state, and determines old or error-correction-failed data of each memory unit as in a second state.

3. The data storage device according to claim 2, wherein, when performing the garbage collection operation, the controller determines new data in the first state in each memory unit as valid data, and determines the data in the second state in each memory unit or old data in the first state in each memory unit as invalid data.

4. The data storage device according to claim 2, wherein, when performing the garbage collection operation, the controller determines new and error-correction-successful data of each second memory unit as valid data, and determines old or error-correction-failed data of each second memory unit as invalid data.

5. The data storage device according to claim 1, wherein, when performing the garbage collection operation, the controller classifies data stored in the first to third memory units into valid data and invalid data, moves the valid data to other memory units, and performs an erase operation to the first to third memory units.

6. The data storage device according to claim 1, wherein the controller performs the state determination operation to the third memory units in order of the write sequence until an empty memory unit Is detected.

7. A method for operating a data storage device, comprising:
  performing a state determination operation to first memory units in order of a write sequence until a memory unit stored with an error-correction-failed data after a power supply is restored after an abnormal power-off;
  skipping the state determination operation to second memory units between the memory unit storing the error-correction-failed data and a pointed memory unit;
  performing the state determination operation to third memory units after the pointed memory unit in order of the write sequence; and
  performing a garbage collection operation to the first to third memory units after completion of all of the state determination operations,
  wherein the second memory units are memory units for which mapping update is completed before the abnormal power-off occurs, and the third memory units are memory units for which mapping update is not completed before the abnormal power-off occurs.

8. The method according to claim 7, wherein the performing of the state determination operation comprises:
  determining new and error-correction-successful data of each memory unit as in a first state; and
  determining old or error-correction-failed data of each memory unit as in a second state.

9. The method according to claim 8, wherein the performing of the garbage collection operation comprises:
  determining new data in the first state in each memory unit as valid data; and
  determining the data in the second state in each memory unit or old data in the first state in each memory unit as invalid data.

10. The method according to claim 7, wherein the performing of the garbage collection operation comprises:
  determining new and error-correction-successful data of each second memory unit as valid data; and
  determining old or error-correction-failed data of each second memory unit as invalid data.

11. The method according to claim 7, wherein the performing of the garbage collection operation comprises:
  classifying data stored in the first to third memory units, into valid data and invalid data;
  moving the valid data to other memory units; and
  performing an erase operation to the first to third memory units.

12. The method according to claim 7, wherein the state determination operation is performed to the third memory units in order of the write sequence until an empty memory unit is detected.

13. A method for operating a data storage device, comprising:
  performing a state determination operation to a plurality of memory units in order of a write sequence after a power supply is restored after an abnormal power-off; and
  performing a garbage collection operation to the memory units after completion of all of the state determination operations,
  wherein the state determination operation is skipped for memory units for which mapping update is completed before the abnormal power-off occurs, and
  wherein the memory units for which the state determination operation is performed are memory units for which mapping update is not completed before the abnormal power-off occurs.

14. The method according to claim 13, wherein the performing of the state determination operation comprises:
  determining new and error-correction-successful data of each memory unit as in a first state; and
  determining old or error-correction-failed data of each memory unit as in a second state.

15. The method according to claim 14, wherein the performing of the garbage collection operation comprises:
  determining new data in the first state in each memory unit as valid data; and
  determining the data in the second state in each memory unit or old data in the first state in each memory unit as invalid data.

16. The method according to claim 13, wherein the performing of the garbage collection operation comprises:
  determining new and error-correction-successful data of each memory unit for which the state determination operation is skipped as valid data; and
  determining old or error-correction-failed data of each memory unit for which the state determination operation is skipped as invalid data.

17. The method according to claim 13, wherein the state determination operation is performed to the memory units in order of the write sequence until an empty memory unit is detected.

* * * * *